United States Patent [19]
Harada

[11] Patent Number: 5,231,964
[45] Date of Patent: Aug. 3, 1993

[54] INTAKE AIR CONTROL DEVICE FOR AN INTERNAL COMBUSTION ENGINE

[75] Inventor: Kenichi Harada, Susono, Japan

[73] Assignee: Toyota Jidosha Kabushiki Kaisha, Aichi, Japan

[21] Appl. No.: 975,186

[22] Filed: Nov. 12, 1992

[30] Foreign Application Priority Data

Nov. 13, 1991 [JP] Japan .................. 3-297080
Jul. 16, 1992 [JP] Japan .................. 4-189499

[51] Int. Cl.⁵ .................. F02B 31/00; F02M 35/10
[52] U.S. Cl. .................................................. 123/306
[58] Field of Search .................. 123/306, 308, 417

[56] References Cited

U.S. PATENT DOCUMENTS

| 4,494,509 | 1/1985 | Ma .................................. 123/306 |
| 4,523,559 | 6/1985 | Latsch ............................ 123/306 |
| 4,532,902 | 8/1985 | Mizuno ........................... 123/308 |
| 4,539,954 | 9/1985 | Klonp ............................. 123/306 |
| 4,592,315 | 6/1986 | Kabayashi ...................... 123/308 |
| 4,598,678 | 7/1986 | Kobayashi et al. ............ 123/306 |
| 4,704,996 | 11/1987 | Morikawa ...................... 123/306 |
| 4,753,200 | 6/1988 | Kawamura et al. ............ 123/306 |
| 4,823,753 | 4/1989 | Murakami et al. ............. 123/306 |
| 4,844,040 | 7/1989 | Leighton et al. .............. 123/306 |
| 4,850,317 | 7/1989 | Katsumoto et al. ........... 123/306 |

FOREIGN PATENT DOCUMENTS

| 62-31728 | 2/1987 | Japan .............. 123/306 |
| 62-276244A | 12/1987 | Japan .............. 123/306 |
| 3-95076 | 9/1991 | Japan .............. 123/306 |

Primary Examiner—Raymond A. Nelli
Attorney, Agent, or Firm—Kenyon & Kenyon

[57] ABSTRACT

An intake air control device including swirl control means for controlling the intensity of a swirl in the combustion chamber. If combustion becomes worse during driving conditions under which a strong swirl should be created, an order means issues an order to actuate the swirl control means so as to weaken the intensity of the strong swirl. Next, a determination means determines whether combustion after the order is worse than combustion before the order, and when the result is negative, it is determined that a swirl control means problem has occurred.

19 Claims, 5 Drawing Sheets

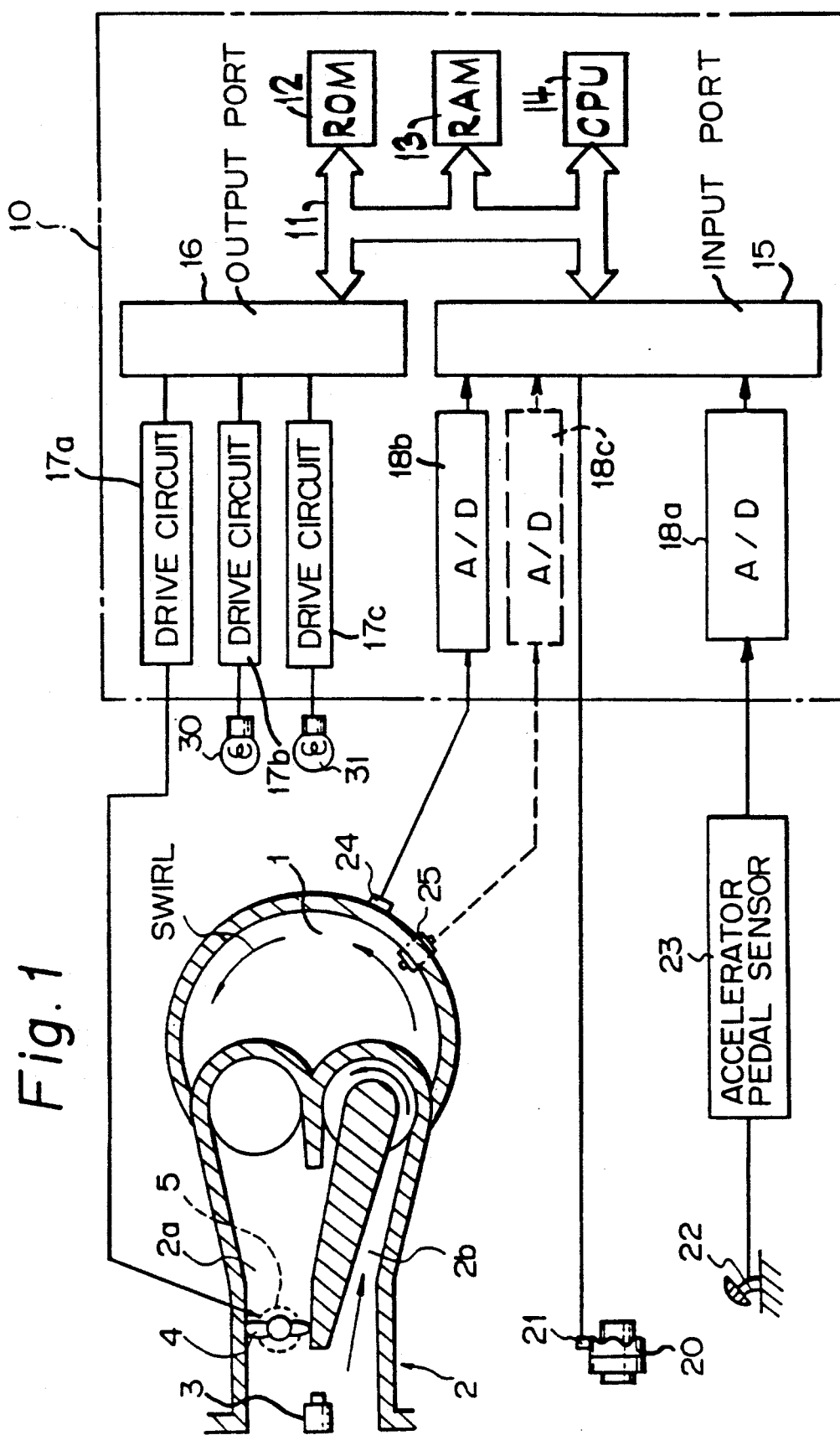

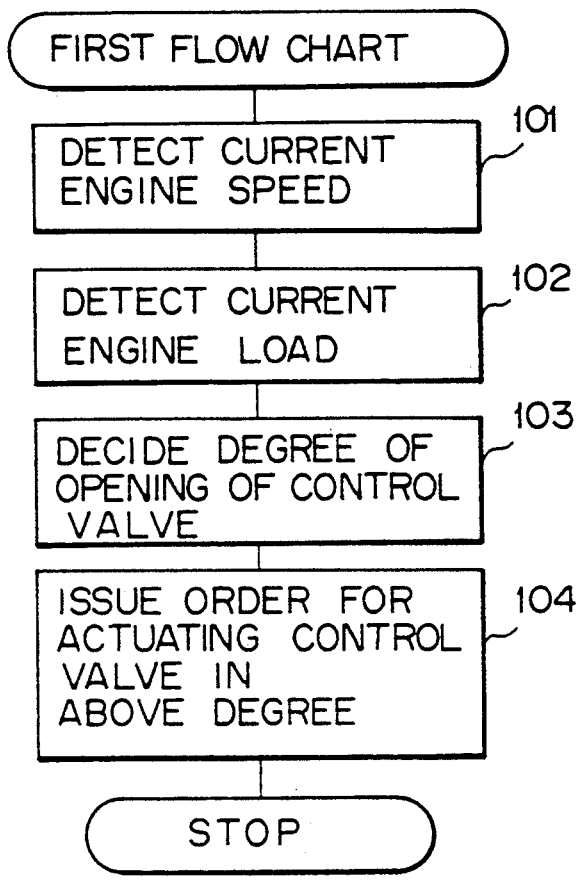
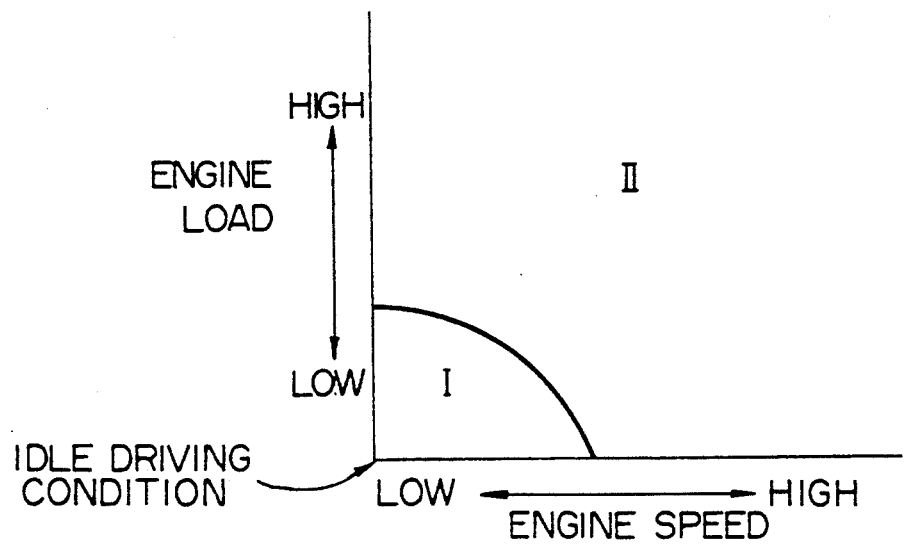

INTAKE AIR CONTROL DEVICE FOR AN INTERNAL COMBUSTION ENGINE

BACKGROUND OF THE INVENTION

1. Field of the Invention

The present invention relates to an intake air control device for an internal combustion engine, the device comprising swirl control means for controlling the intensity of the swirl in the combustion chamber, in accordance with an engine driving condition.

2. Description of the Related Art

In the case of an engine having a single intake port, for example, a deflecting valve as the above swirl control means is arranged in the intake port, which valve deflects an intake air flow against the center of the combustion chamber. The more the deflecting valve is closed, the more an intake air flow is deflected so that a stronger lateral swirl can be created in the combustion chamber. On the other hand, when the deflecting valve is fully opened, an intake air flow is not deflected and a swirl is not created.

In the case of the engine having a straight intake port, and a helical intake port formed to create a swirl in the combustion chamber, for example, a control valve as the above swirl control means is arranged in the straight intake port. When the control valve closes the straight port, intake air passes through only the helical port and is supplied to the combustion chamber so that a strong swirl can be created therein. When the control valve is fully opened, intake air passes through the straight intake port and the helical intake port and is supplied in the combustion chamber so that a swirl is not created therein. On the other hand, for example, stopping means for stopping the motion of an intake valve corresponding to the straight intake port as the above swirl control means, may be provided instead of the above control valve and driving unit. In an intake stroke, only the intake valve corresponding to the straight intake port remains closed by the stopping means, so that the intake valve closes the straight intake port, and thus the swirl can be created in the combustion chamber. Of course, when the motion of the intake valve corresponding to the straight intake port is not stopped, the intake air passes through the straight intake port and the helical intake port so that a swirl is not created therein.

Once the strong swirl is created in the combustion chamber, combustion becomes very good so that a lean mixture can be burned and a large amount of exhaust gases can be recirculated, whereby fuel consumption can be reduced and the amount of nitrogen oxides included in the exhaust gases can be decreased considerably.

However, in any one of these swirl control means, when a strong swirl is created in the combustion chamber, the section of the intake air passage is narrowed down, so that a relatively large amount of intake air cannot be supplied in the combustion chamber. Therefore, the swirl cannot always be created, and it is created only when, for example, there is a low engine load, which requires a relatively small amount of intake air.

If the above swirl control means is not actuated by an actuating order for creating the swirl, the swirl cannot be created when the swirl is required. If this occurs, combustion deteriorates considerably under low engine load driving conditions, because the mixture is made lean and a large amount of exhaust gas is recirculated in the hope of attaining a strong swirl. Accordingly, in the internal combustion engine comprising an intake air control device with the swirl control means, it is important for a user to be aware of the problem and obviate same at an early stage.

Japanese Unexamined Patent Publication No. 62-276244 discloses an intake air control device comprising the swirl control means and a problem detecting means for detecting the above problem; the detecting means of which determines that the problem has occurred when an amount of intake air measured actually is more than that estimated, when the swirl control means should be in a position to create the swirl.

The above problem detecting means is carried out when the swirl should be created; namely under low engine load driving conditions. Under these driving conditions, the required amount of intake air is relatively small so that the degree of opening a throttle valve arranged upstream of the swirl control means is relatively small and the actual amount of intake air at this time depends substantially on the degree of opening the throttle valve. Therefore, even if the problem occurs, the actual amount of intake air increases only slightly in contrast to that estimated.

Once the throttle valve and the intake valves become dirty, the amount of intake air decreases slightly. At this time, the amount decreased and the above amount increased by the above problem easily offset each other so that the above problem detecting means cannot detect the problem accurately.

On the other hand, there is the idea that in the engine driving conditions under which the swirl should be created, if combustion becomes worse, it is determined that the swirl control means problem has occurred. Though, combustion deterioration can also be caused by other problems, such as an ignition system or fuel injection system malfunction and the like, and thus the swirl control means problem cannot be detected accurately.

SUMMARY OF THE INVENTION

Therefore, an object of the present invention is to provide an intake air control device for an internal combustion engine comprising swirl control means that can accurately detect the above problem associated with the swirl control means.

According to the present invention there is provided an intake air control device comprising: first detection means for detecting a current engine driving condition; swirl control means for controlling the intensity of a swirl in a combustion chamber; first determination means for determining if the current engine driving condition is within a range of driving conditions under which a relatively strong swirl should be created; first order means for issuing an order to actuate the swirl control means so as to create the relatively strong swirl when the result in the first determination means is affirmative; second determination means for determining whether combustion becomes worse than one of the normal functioning identical engine under the same driving condition, at least when the result in the first determination means is affirmative; second order means for issuing an order to actuate the swirl control means so as to weaken the intensity of the relatively strong swirl when the result in the second determination means is affirmative; and third determination means for determining whether combustion after the order issued by said second order means becomes worse than that before the order.

The present invention will be more fully understood from the description of the preferred embodiments of the invention set forth below, together with the accompanying drawings.

BRIEF DESCRIPTION OF THE DRAWINGS

In the drawings:

FIG. 1 is a schematic view of an intake air control device as a first embodiment of the present invention;

FIG. 2 is a first flow chart for actuating a swirl control means by an electronic control unit;

FIG. 3 is a first map for deciding upon the position of the swirl control means;

DESCRIPTION OF THE PREFERRED EMBODIMENTS

Figure 4:
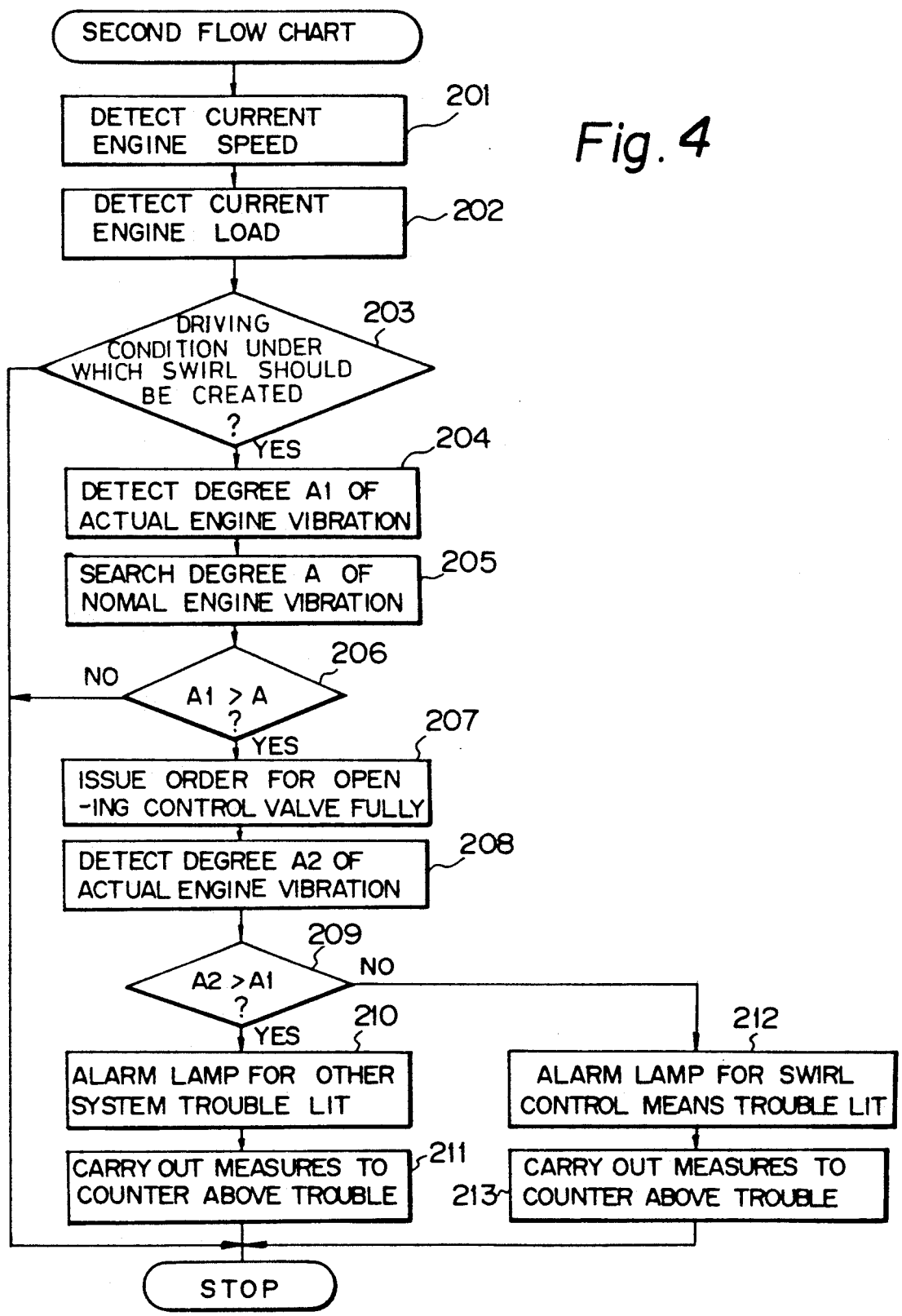
FIG. 4 is a second flow chart for detecting the problem associated with the swirl control means by the electronic control unit.

FIG. 1 shows a first embodiment of the intake air control device for an internal combustion engine comprising swirl control means according to the present invention. In this figure, reference numerals 1 and 2 designate a combustion chamber and an intake passage, respectively. The intake passage 2 has a straight port 2a and a helical port 2b, both of which lead to the combustion chamber 1 via an each intake valve (not shown) on one end, and merge together on the other end. A fuel injector 3 for injecting fuel to each port, is arranged at said merging point. In the neighborhood of the merging point, the straight port 2a is provided with a control valve 4. A driving unit 5 as a step motor for driving the control valve 4 is mounted outside of the intake passage 1, and is controlled by the electronic control unit (ECU) 10. In the present embodiment, swirl control means consists of the control valve 4 and the driving unit 5.

The ECU 10 is constructed as a digital computer and includes a ROM (read only memory) 12, a RAM (random access memory) 13, a CPU (microprocessor, etc.) 14, an input port 15, and an output port 16. The ROM 12, the RAM 13, the CPU 14, the input port 15, and the output port 16 are interconnected by a bidirectional bus 11.

A distributor 20 is provided with a crank angle sensor 21 connected to the input port 15. An accelerator pedal sensor 23 for detecting the degree of opening an accelerator pedal 22 and an acceleration sensor 24 for detecting the degree of actual engine vibration are also connected to the input port 15, via AD converters 18a and 18b, respectively. The output port 16 is connected to the driving unit 5 via a drive circuit 17. Also, the output port 16 is connected through corresponding drive circuits 17b and 17c to an alarm lamp 30 that informs a user of a problem associated with the swirl control means and an alarm lamp 31 that informs the user of a problem associated with other systems.

The ECU 10 issues an order for actuating the control valve 4 to the driving unit 5, according to a first flow chart shown in FIG. 2. The first flow chart is executed at every predetermined time.

At step 101, a current engine speed is detected on the basis of a signal from the crank angle sensor 21, and the routine proceeds to step 102.

At step 102, a current engine load is detected on the basis of a signal from the accelerator pedal sensor 23, and the routine proceeds to step 103.

At step 103, a decision is made regarding the degree of opening the control valve 4 on the basis of a current engine driving condition represented by the current engine speed and load, and the routine proceeds to step 104.

At step 104, an order for actuating the control valve 4 to a degree of opening that is decided at step 103 is issued to the driving unit 5.

The decision at step 103 is carried out by using a first map for determining the degree of opening the control valve 4, shown in FIG. 3, in which area I represents driving conditions requiring only a small amount of intake air so that the control valve 4 is fully closed. Whereby, if the control valve 4 and the driving unit 5 function normally, the control valve 4 is fully closed at step 104 so that sufficient intake air is supplied to the combustion chamber 1 via only the helical port 2b, and thus a strong swirl is created therein.

On the other hand, in the first map, area II represents driving conditions causing an insufficient amount of intake air by using only the helical port 2b so that the control valve 4 is fully opened. Whereby, the control valve 4 is fully opened at step 104 so that a swirl is not created in the combustion chamber 1, but intake air is supplied to the combustion chamber 1 sufficiently via the straight port 2a and the helical port 2b.

When the current engine driving condition is within area I, a strong swirl is created so that combustion becomes very good. Therefore, a lean mixture can be burned and fuel consumption can be reduced. Also, in the case of the engine comprising an exhaust gas recirculation system, a large amount of exhaust gas can be recirculated. The main components of the exhaust gas are inert gases having a large heat capacity. Whereby, the recirculation of a large amount of exhaust gas reduces the combustion temperature considerably, so that the amount of nitrogen oxides included in the exhaust gas can be reduced considerably.

However, if the control valve 4 is fixed in the open position, or it remains in the open position due to a failure of the driving unit 5, a strong swirl cannot be created in the combustion chamber 1 when the current engine driving condition is within area I. Whereby, if the amount of fuel injected is not increased and the amount of exhaust gas recirculated is not reduced, combustion deteriorates considerably. Accordingly, it is important for a user to be aware of this problem and obviate same at an early stage.

In the first embodiment, the ECU 10 detects the problem according to a second flow chart shown in FIG. 4. The second flow chart is executed at every predetermined time.

At step 201, the current engine speed is detected on the basis of a signal from the crank angle sensor 21, and at step 202, a current engine load is detected on the basis of a signal from the accelerator pedal sensor 23, and the routine proceeds to step 203.

At step 203, it is determined whether a current engine driving condition represented by the current engine speed and load is within a range of driving conditions under which a strong swirl should be created in the combustion chamber 1. In the case of the present embodiment, the above range is equal to the area I. If the result is negative, the routine is ended.

Figure 5:
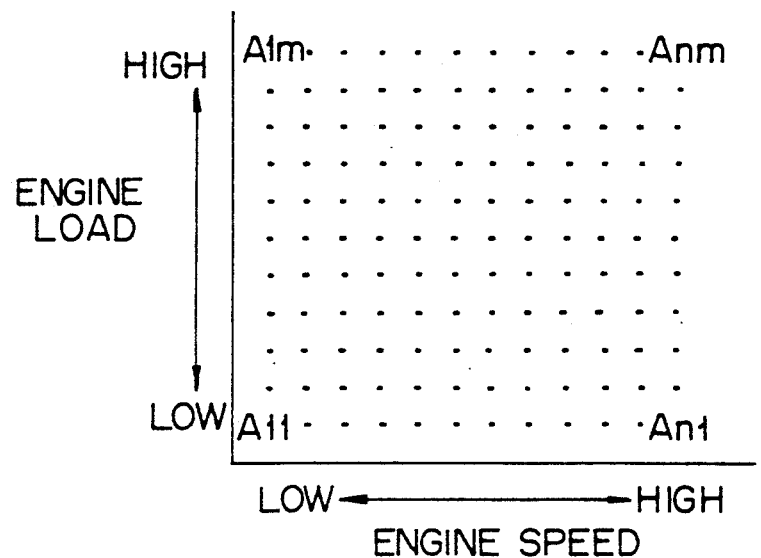
FIG. 5 is a map for determining normal engine vibration.

When the result at step 203 is affirmative, the routine proceeds step 204 and the degree A1 of actual engine vibration as a current combustion condition is detected on the basis of a signal from the acceleration sensor 24. Next, at step 205, a search is made to determine the degree A of normal engine vibration on the basis of the current engine speed and load, by using a map for determining normal engine vibration as shown in FIG. 5, in which the degree A of normal engine vibration measured previously in the normal functioning identical engine is set at every engine driving condition, and the routine proceeds to step 206.

At step 206, it is determined whether the degree A1 of actual engine vibration is larger than the degree A of normal engine vibration searched at step 205, and if the result is negative, combustion is good and all systems of the engine function normally so that the routine is ended. On the other hand, when the result at step 206 is affirmative, the routine proceeds to step 207.

At step 207, an order for fully opening the control valve 4 is issued to the driving unit 5, and at step 208, the degree A2 of actual engine vibration is detected again on the basis of a signal from the acceleration sensor 24. Next, at step 209, it is determined whether the degree A2 of actual engine vibration after the order at step 207 is larger than the degree A1 of actual engine vibration before the order.

If the control valve 4 and the driving unit 5 function normally, the control valve 4 is turned from the closing position to the opening position, by the order issued at step 207. Hence, it follows that a swirl is not created in the combustion chamber 1 so that combustion further deteriorates. Therefore, when the result at step 209 is affirmative, the control valve 4 and the driving unit 5 function normally and it is thought that the reason for combustion deterioration at step 206 is a problem other than the problem associated with the control valve 4 or the driving unit 5, the routine proceeds to step 210, and the alarm lamp 31 informing the user of a problem in the ignition system or fuel injection system and the like is lit. Next, at step 211, simple measures to counter these problems are carried out as a first step, and the above systems can be repaired at a service station in the future.

On the other hand, when the result at step 209 is negative, the intensity of the swirl in the combustion chamber 1 does not change, i.e., the control valve 4 is not actuated in spite of the order to open same. Therefore, a problem associated with the control valve 4 or the driving unit 5 occurs certainly so that the routine proceeds to step 212, and the alarm lamp 30 informing the user of a swirl control means problem is lit. Next, at step 213, simple measures to counter the problem are carried out as a first step, and the control valve 4 and/or the driving unit 5 can be repaired at a service station in the future. The amount of fuel injected, fuel injection timing, ignition timing, the amount of exhaust gas recirculated, and the like, are controlled so as to obtain good combustion without the swirl in the combustion chamber 1, as the simple measures.

Figure 6:
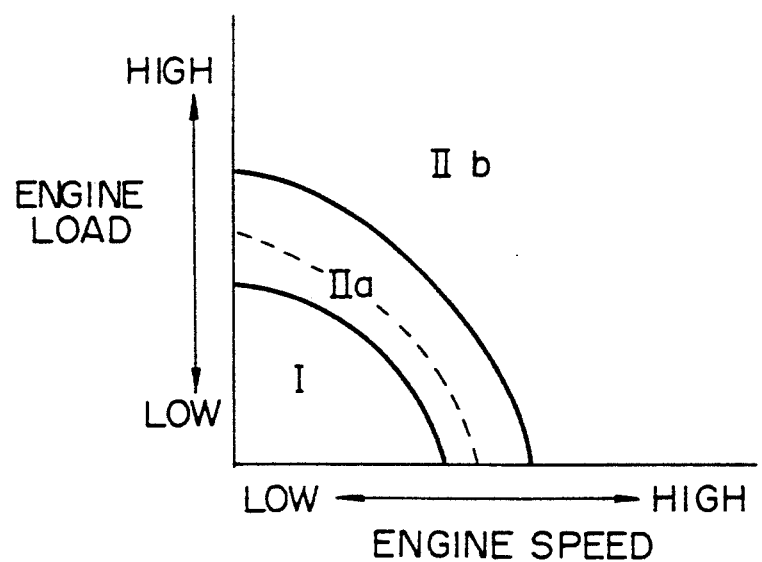
FIG. 6 is a second map for deciding upon the position of the swirl control means.

Note, in the first flow chart, the decision concerning the degree of opening the control valve 4 is carried out by using the first map shown in FIG. 3, but it may be carried out by using the second map shown in FIG. 6. In the second map, the area II in the first map is divided into two areas IIa, IIb. The area IIb represents driving conditions requiring a large amount of intake air so that the control valve 4 is fully opened. On the other hand, the area IIa represents driving conditions not requiring a large amount of intake air so that it is not necessary for the control valve 4 to be fully opened, and thus, the control valve 4 is partly opened corresponding to the required amount of intake air. Therefore, when the current engine driving condition is within the area IIa and the degree of opening the control valve 4 is relatively small, the amount of intake air passing through the straight port 2a is relatively small so that a relatively strong swirl can be created by the intake air passing through the helical port 2b. The limit for creating this relatively strong swirl is shown by the dotted line in the second map.

Accordingly, by using the second map, the range of driving conditions under which a relatively strong swirl can be created, can be extended. Note, when the second map is used in the first flow chart, during the process at step 203 of the second flow chart, the range of driving conditions under which a strong swirl should be created is represented by area I and the part of area IIa (the limit is shown by the dotted line).

Figure 7:
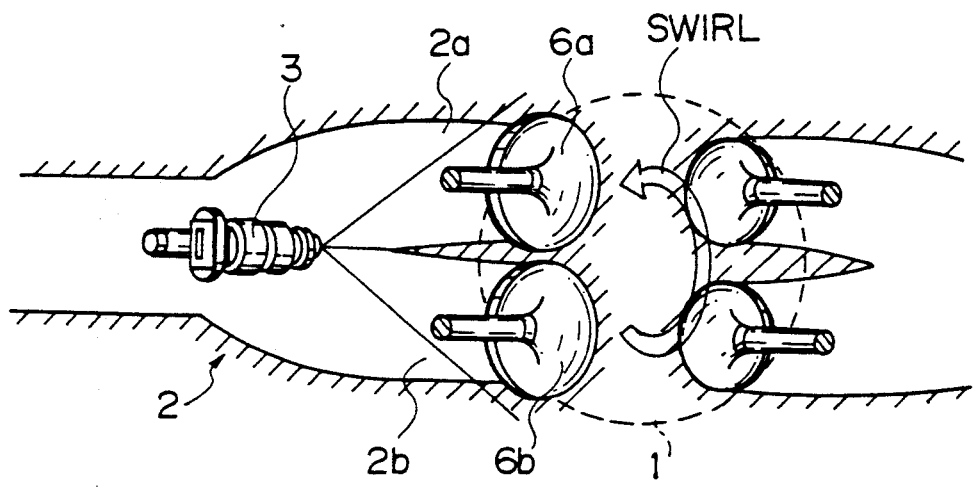
FIG. 7 is a schematic view of an intake air control device as a second embodiment of the present invention.

FIG. 7 shows a second embodiment of the intake air control device, wherein the difference between the first and the second embodiments is explained as follows.

Figure 8:
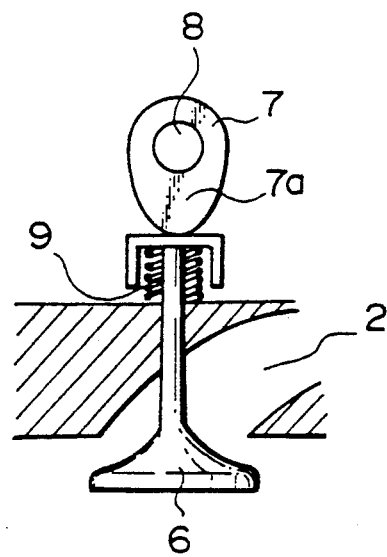
FIG. 8 is a view explaining the intake valve motion.

Conventionally, as shown in FIG. 8, the rod of the intake valve 6 makes contact with a cam 7, and when the cam 7 is turned with a cam shaft 8 and the rod makes contact with a lobe 7a of the cam 7, the intake valve 6 is lowered against a spring 9 thereby forcing the intake valve 6 upward. In the second embodiment, the control valve 4 and the driving unit 5 are omitted, and the intake valve 6a corresponding to the straight port 2a is provided with a stopping means for stopping such a lowering motion of the intake valve 6a. For example, the stopping means comprises a moving means for sliding the cam 7a with the cam shaft 8a for the intake valve 6a. Whereby, if the stopping means is actuated, the cam 7a is detached from the rod of the intake valve 6a, and thus the intake valve 6a remains in a lifting position and the straight port 2a is always closed by the intake valve 6a, as disclosed in Japanese Unexamined Utility Model Publication No. 3-95076 or Japanese Unexamined patent Publication No. 4-50468. In the present embodiment, the swirl control means consists of the stopping means.

The stopping means is controlled by an ECU (not shown), such as the ECU 10 in the first embodiment. A flow chart (not shown) for controlling the stopping means resembles the first flow chart in FIG. 2. The difference between these two flow charts is that an order for actuating the stopping means, not fully closing the control valve 4, is issued when the current engine driving condition is within the area I in the first map shown in FIG. 3; whereby, under this driving condition, the straight port 2b is always closed by the intake valve 6a so that during the intake stroke, intake air only passes through the helical port 2b and is supplied to the combustion chamber 1, and thus a strong swirl can be created therein.

In the second embodiment, the ECU detects the fact that the stopping means is not actuated, according to a flow chart (not shown), such as the second flow chart in FIG. 4. The difference between these two flow charts is that in one an order for actuating the stopping means, not fully opening the control valve 4, is issued when the degree A1 of actual engine vibration is larger than the degree A of normal engine vibration. Accordingly, in the present embodiment, the swirl control means problem can also be detected accurately.

Note, in the second flow chart for detecting the swirl control means problem, the acceleration sensor 24 is used to determine combustion deterioration. However, another sensor, for example, the crank angle sensor 21 or the pressure sensor 25, can also be used. In the case of using the crank angle sensor 21, the fact that the degree of lack of uniformity in all engine cylinder speeds increases when combustion deteriorates is known. On the other hand, in the case of using the pressure sensor 25, the pressure sensor 25 is connected to the input port 15 of ECU 10 via an AD converter 18c, as shown by dot lines in FIG. 1, and the fact that combustion pressure drops when combustion deteriorates is known.

Thus, in the engine comprising the intake air control device with the swirl control means, if combustion deteriorates during driving conditions under which the swirl should be created, the order for actuating the swirl control means to a position at which the swirl is not created is issued. Next, combustion condition before and after the order are compared, and combustion further deteriorates, it is determined that the swirl control means functions normally, but combustion condition does not change, in contrast to the former, it is determined that the swirl control means problem has occurred. The problem can be detected more accurately than the prior art using the fact that the amount of intake air increases when the swirl control means problem occurs. Note, the above order should not be limited to an order for stopping the production of a swirl, and may be at least an order for weakening the intensity of the swirl.

Although the invention has been described with reference to specific embodiments thereof, it should be apparent that numerous modifications can be made thereto by those skilled in the art, without departing from the basic concept and scope of the invention.

I claim:

1. An intake air control device for an internal combustion engine comprising:
   first detection means for detecting a current engine driving condition;
   swirl control means for controlling the intensity of a swirl in a combustion chamber;
   first determination means for determining if said current engine driving condition is within a range of driving conditions under which a relatively strong swirl should be created;
   first order means for issuing an order to actuate said swirl control means so as to create said relatively strong swirl when the result in said first determination means is affirmative;
   second determination means for determining whether the combustion becomes worse than one of the normal functioning identical engine under the same driving condition, at least when the result in said first determination means is affirmative;
   second order means for issuing an order to actuate said swirl control means so as to weaken the intensity of said relatively strong swirl when the result in said second determination means is affirmative; and
   third determination means for determining whether combustion after said order issued by said second order means becomes worse than that before said order.

2. An intake air control device according to claim 1, wherein said second order means issues an order to actuate said swirl control means so as to stop production of the swirl when the result in said second determination means is affirmative.

3. An intake air control device according to claim 1, wherein said swirl control means is actuated selectively in a strong swirl created position or no swirl created position by said first and second order means.

4. An intake air control device according to claim 1, wherein said second determination means comprises second detection means for detecting the degree of combustion; the degree of combustion under the current engine driving condition being compared with the degree of combustion measured previously in a normal functioning identical engine under the same driving condition.

5. An intake air control device according to claim 1, wherein said third determination means comprises third detection means for detecting the degree of combustion; the degree of combustion after said order issued by said second order means being compared to the degree of combustion before said order.

6. An intake air control device according to claim 4, wherein said second detection means detects the degree of engine vibration as said degree of combustion.

7. An intake air control device according to claim 4, wherein said second detection means detects combustion pressure as said degree of combustion.

8. An intake air control device according to claim 4, wherein said second detection means detects the degree of lack of uniformity under all engine cylinder speeds as said degree of combustion.

9. An intake air control device according to claim 6, wherein said second detection means detects the degree of engine vibration by an acceleration sensor.

10. An intake air control device according to claim 7, wherein said second detection means detects combustion pressure by a pressure sensor.

11. An intake air control device according to claim 8, wherein said second detection means detects the degree of lack of uniformity under all engine cylinder speeds by a crank angle sensor.

12. An intake air control device according to claim 5, wherein said third detection means detects the degree of engine vibration as said degree of combustion.

13. An intake air control device according to claim 5, wherein said third detection means detects combustion pressure as said degree of combustion.

14. An intake air control device according to claim 5, wherein said third detection means detects the degree of lack of uniformity under all engine cylinder speeds as said degree of combustion.

15. An intake air control device according to claim 12, wherein said third detection means detects the degree of engine vibration by an acceleration sensor.

16. An intake air control device according to claim 13, wherein said third detection means detects combustion pressure by a pressure sensor.

17. An intake air control device according to claim 14, wherein said third detection means detects the degree of lack of uniformity under all engine cylinder speeds by a crank angle sensor.

18. An intake air control device according to claim 2, further comprising a straight port and a helical port for creating a swirl in the combustion chamber; said swirl control means consists of a control valve arranged in said straight port and a driving unit for driving said control valve.

19. An intake air control device according to claim 2, further comprising a straight port and a helical port for creating a swirl in the combustion chamber; said swirl control means consists of a stopping means for stopping an opening motion of an intake valve corresponding to said straight port.

* * * * *